(12) United States Patent
Hovakimyan et al.

(10) Patent No.: US 7,577,356 B2
(45) Date of Patent: *Aug. 18, 2009

(54) OPTICAL COMMUNICATION SYSTEMS AND METHODS OF OPERATING SUCH OPTICAL COMMUNICATION SYSTEMS

(75) Inventors: Karen Hovakimyan, Sunnyvale, CA (US); Danzhu Wu, San Jose, CA (US)

(73) Assignee: Allied Telesis, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/105,582

(22) Filed: Apr. 18, 2008

(65) Prior Publication Data

US 2008/0199178 A1    Aug. 21, 2008

Related U.S. Application Data

(63) Continuation of application No. 11/266,310, filed on Nov. 4, 2005, now Pat. No. 7,447,424.

(51) Int. Cl.
*H04B 10/08* (2006.01)
*H04J 14/00* (2006.01)

(52) U.S. Cl. .................... 398/33; 398/5; 398/45

(58) Field of Classification Search ............ 398/4, 398/5, 20, 25–27, 33, 44, 45
See application file for complete search history.

(56) References Cited

U.S. PATENT DOCUMENTS

| 6,933,852 B2 * | 8/2005 | Kitajima et al. ............ 340/635 |
| 2002/0141009 A1 | 10/2002 | Yu et al. |
| 2004/0197097 A1 | 10/2004 | Downie et al. |
| 2007/0104484 A1 * | 5/2007 | Hovakimyan et al. ......... 398/45 |

* cited by examiner

*Primary Examiner*—Dalzid Singh
(74) *Attorney, Agent, or Firm*—Arent Fox LLP

(57) ABSTRACT

An optical communication system includes a first optical device including a transmission optical switch and a controller coupled to the transmission optical switch, and a second optical device coupled to the first optical device via each of a first fiber and a second fiber. The transmission optical switch is configured to operate in one of a first mode associated with the first fiber and a second mode associated with the second fiber based on control signals generated by the controller. Moreover, the controller is configured to perform a non-revertive switching operation on the transmission optical switch based on the satisfaction or the non-satisfaction of a predetermined condition or a plurality of predetermined conditions.

2 Claims, 8 Drawing Sheets

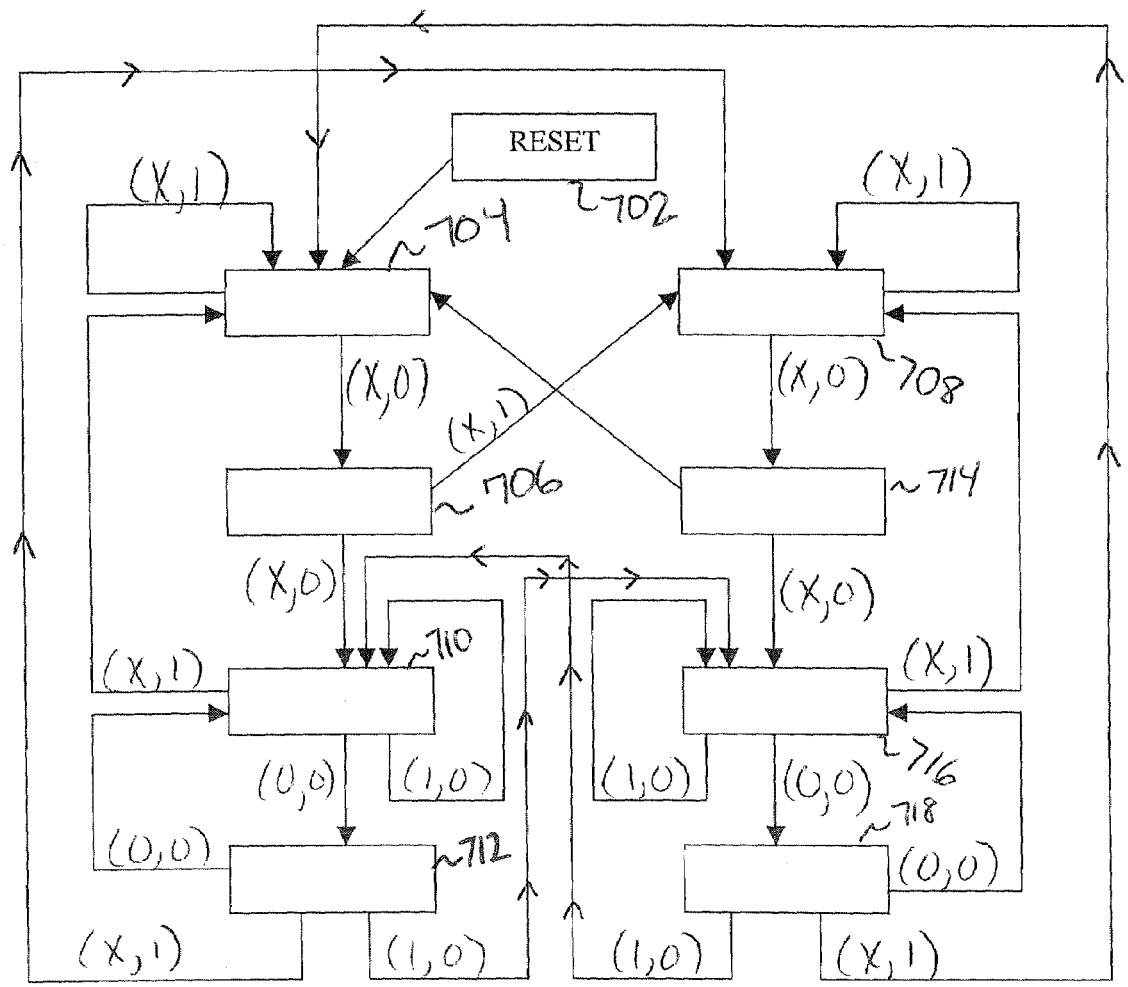

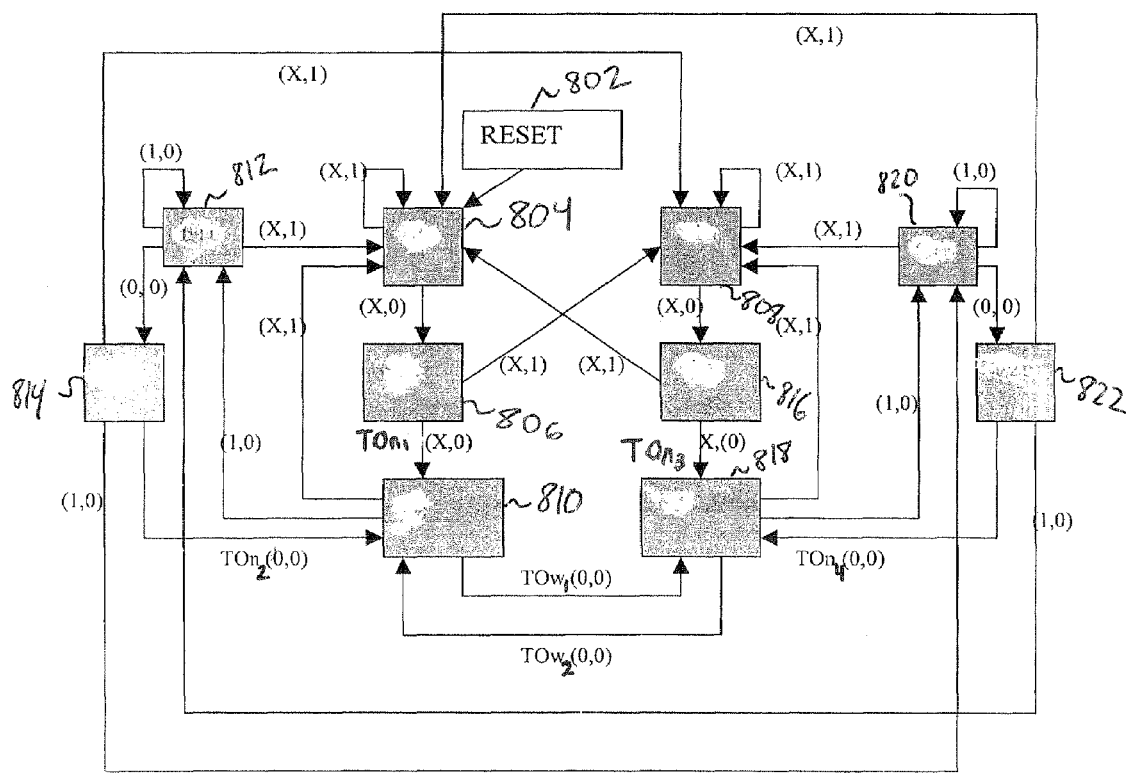

# US 7,577,356 B2

OPTICAL COMMUNICATION SYSTEMS AND METHODS OF OPERATING SUCH OPTICAL COMMUNICATION SYSTEMS

This application is a continuation of U.S. patent application Ser. No. 11/266,310, filed Nov. 4, 2005 now U.S. Pat. No. 7,447,424. The entire content of this application is incorporated herein by reference.

BACKGROUND OF THE INVENTION

1. Field of the Invention

The present invention relates generally to optical communication systems and methods of operating such optical communication systems. More particularly, the present invention is directed towards systems and methods that employ non-revertive switching between a primary fiber associated with the optical communication system and a secondary fiber associated with the optical communication system.

2. Description of Related Art

Optical wavelength division multiplexing gradually has become the standard backbone network for fiber optic communication systems. Wavelength division multiplexing systems employ signals that consist of a number of different wavelengths, which are known as carrier signals or channels, to transmit information over optical fibers. Each carrier signal is modulated by one or more information signals. Consequently, a significant number information signals may be transmitted over a signal optical fiber using wavelength division multiplexing technology.

Fiber optic communication systems generally are arranged with a plurality of optical devices in any one of a number of topological configurations. The simplest configuration is two optical devices communicating data over an optical link. This configuration may be extended to a daisy-chain configuration in which three or more optical devices are connected in series by a plurality of optical links. In each of these fiber optic communication systems, the optical link between two optical devices generally includes a plurality of optical fibers, which allows for bidirectional communication between the optical devices, and provides redundancy in the event of a fault in one or more of the optical fibers.

In one known fiber optic communication system, an optical switch may be employed to switch communications between a first pair of optical devices from a primary optical fiber(s) to a protection optical fiber(s) when there is a fault associated with the primary optical fiber(s). This known protection scheme is a one-to-one protection scheme that requires duplicated hardware in the fiber optic communication system. Specifically, a second pair of optical devices are connected to the protection optical fiber(s), such that when there is a fault associated with the primary optical fiber(s) or a fault associated with one of the first pair of optical devices, the system switches from the primary optical fiber(s) to the protection optical fiber(s). Although this protection scheme is reliable because it protects against both optical fiber failure and hardware (optical device) failure, this protection scheme is expensive because it requires that the optical fiber system include duplicated hardware. Another known fiber optic communication system is a revertive protection scheme that does not duplicate hardware in the fiber optic communication system, but instead, only protects against fiber failure. However, this known revertive protection scheme has the disadvantage of using a 3 dB splitter, which has an associated 3 dB losses in optical power.

SUMMARY OF THE INVENTION

Therefore, a need has arisen for optical communication systems and methods for operating such optical communication systems that overcome these and other shortcomings of the related art, as well as accomplishing other goals. An advantage of the present invention is that an optical communication system and method is provided in which various non-revertive optical communication protection schemes are used to protect against optical fiber failure without duplicating the hardware in the optical communication system. A non-revertive optical communication protection scheme is a protection scheme in which when the primary fiber becomes faulty and the protection fiber is employed to replace the primary fiber, the protection fiber remains employed until the protection fiber becomes faulty, regardless of whether the primary fiber is fixed after the primary fiber become faulty.

Other objects, features, and advantages will be apparent to persons of ordinary skill in the art from the following detailed description of the invention and the accompanying drawings.

BRIEF DESCRIPTION OF THE DRAWINGS

For a more complete understanding of the present invention, the needs satisfied thereby, and the objects, features, and advantages thereof, reference now is made to the following description taken in connection with the accompanying drawings.

FIG. 7 is a state machine diagram depicting a scheme for switching between a primary fiber and a secondary (protection) fiber in an optical communication system, according to a further embodiment of the present invention.

FIG. 8 is a state machine diagram depicting a scheme for switching between a primary fiber and a secondary (protection) fiber in an optical communication system, according to still a further embodiment of the present invention.

DETAILED DESCRIPTION OF PREFERRED EMBODIMENTS

Preferred embodiments of the present invention and their features and advantages may be understood by referring to FIGS. 1-8, like numerals being used for like corresponding parts in the various drawings.

Figure 1:
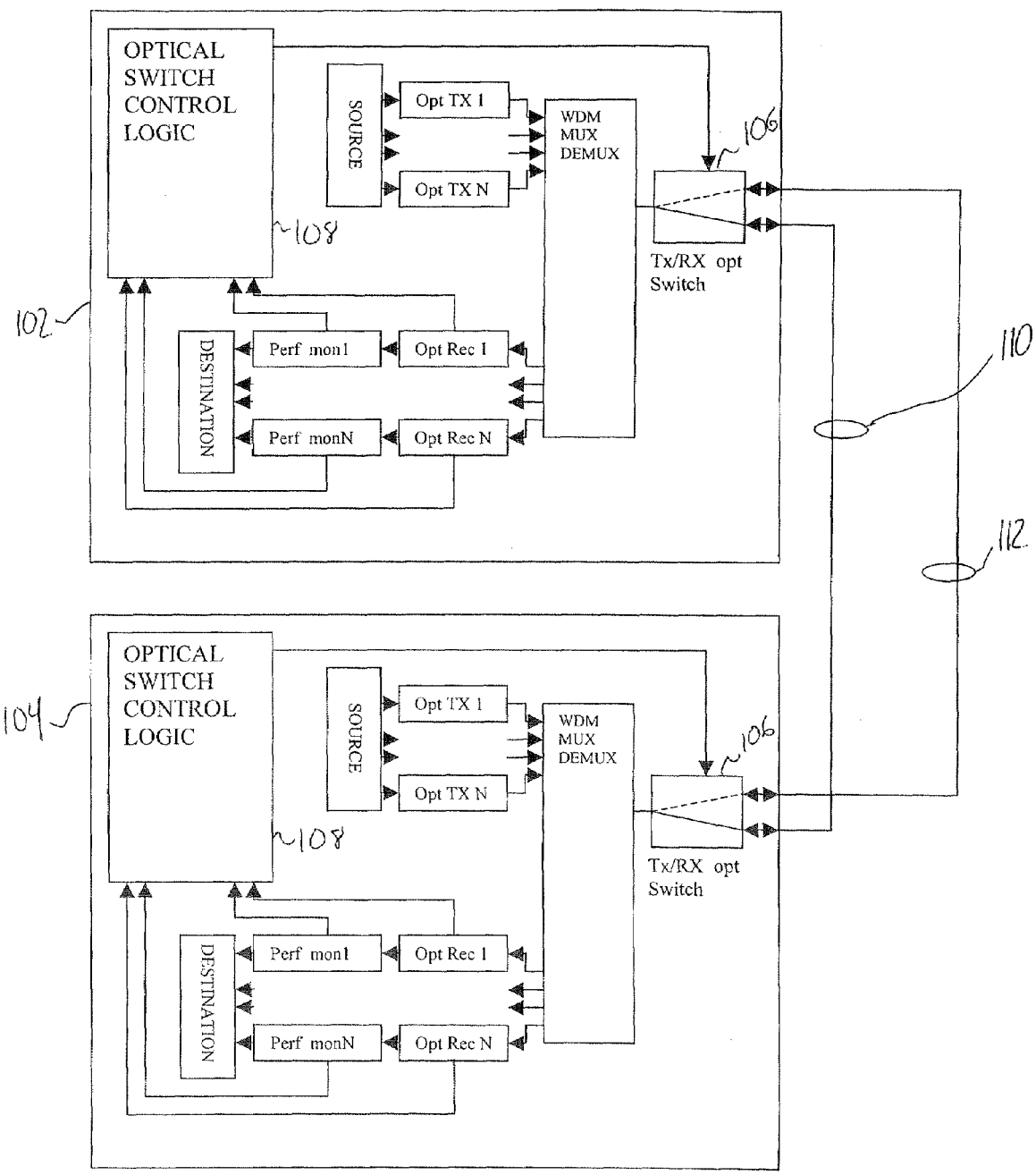
FIG. 1 is a schematic diagram of an optical communication system according to an embodiment of the present invention.
Figure 2:
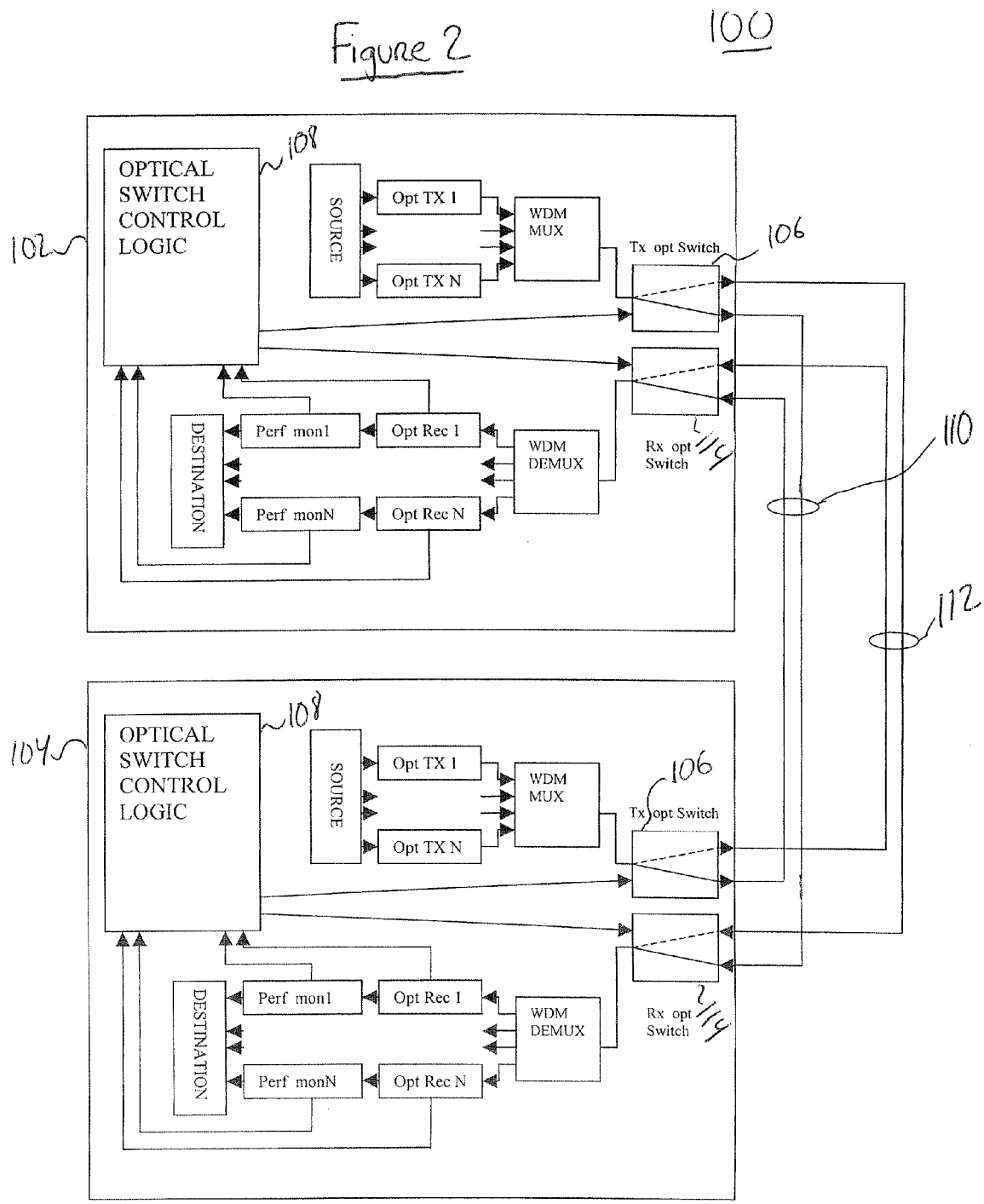
FIG. 2 is a schematic diagram of the optical communication system depicted in FIG. 1, in which a pair of primary optical fibers and a pair of secondary (protection) fibers are employed, according to an embodiment of the present invention.

Referring to FIGS. 1 and 2, an optical communication system 100 according to an embodiment of the present invention is depicted. The optical communication system 100 may comprise a first optical device 102, e.g., a first wavelength division multiplexed transponder, and a second optical device 104, e.g., a second wavelength division multiplexed transponder. Each of the first optical device 102 and the second optical device 104 may comprise a transmission optical switch 106 and a controller 108 that is coupled to the transmission optical switch 106. Moreover, the first optical device 102 may be coupled to the second optical device 104 via at least one primary optical fiber 110 and at least one secondary (protection) optical fiber 112. For example, as shown in FIG. 1, when the first optical device 102 is connected to the second optical device 104 via a single, bidirectional primary optical fiber 110 and a single, bidirectional secondary optical fiber 112, the transmission optical switch 106 may be a dual transmission and reception optical switch. Alternatively, as shown in FIG. 2, when the first optical device 102 is connected to the second optical device 104 via a plurality of primary optical fibers 110 and a plurality of secondary optical fibers 112, each of the first optical device 102 and the second optical device 104 may further comprise a reception optical switch 114. In this embodiment of the present invention, the transmission optical switch 106 of the first optical device 102 may be coupled to the reception optical switch 114 of the second optical device 104 via one of the primary optical fibers 110 and one of the secondary optical fibers 112, and the transmission optical switch 106 of the second optical device 104 may be coupled to the reception optical switch 114 of the first optical device 102 via another of the primary optical fibers 110 and another of the secondary optical fibers 112.

In each of the above-described embodiments of the present invention, the transmission optical switch 106 may be configured to operate in one of a first mode, e.g., a first switch position, that is associated with the primary optical fiber 110, and a second mode, e.g., a second switch position, that is associated with the secondary optical fiber 112. For example, when the transmission optical switch 106 of the first optical device 102 is operating in the first mode, data transmitted by the first optical device 102 to the second optical device 104 may be transmitted via the primary optical fiber 110, and when the transmission optical switch 106 of the first optical device 102 is operating in the second mode, data transmitted by the first optical device 102 to the second optical device 104 may be transmitted via the secondary optical fiber 112. Similarly, when the transmission optical switch 106 of the second optical device 104 is operating in the first mode, data transmitted by the second optical device 104 to the first optical device 102 may be transmitted via the primary optical fiber 110, and when the transmission optical switch 106 of the second optical device 104 is operating in the second mode, data transmitted by the second optical device 104 to the first optical device 102 may be transmitted via the secondary optical fiber 112.

Figure 3:
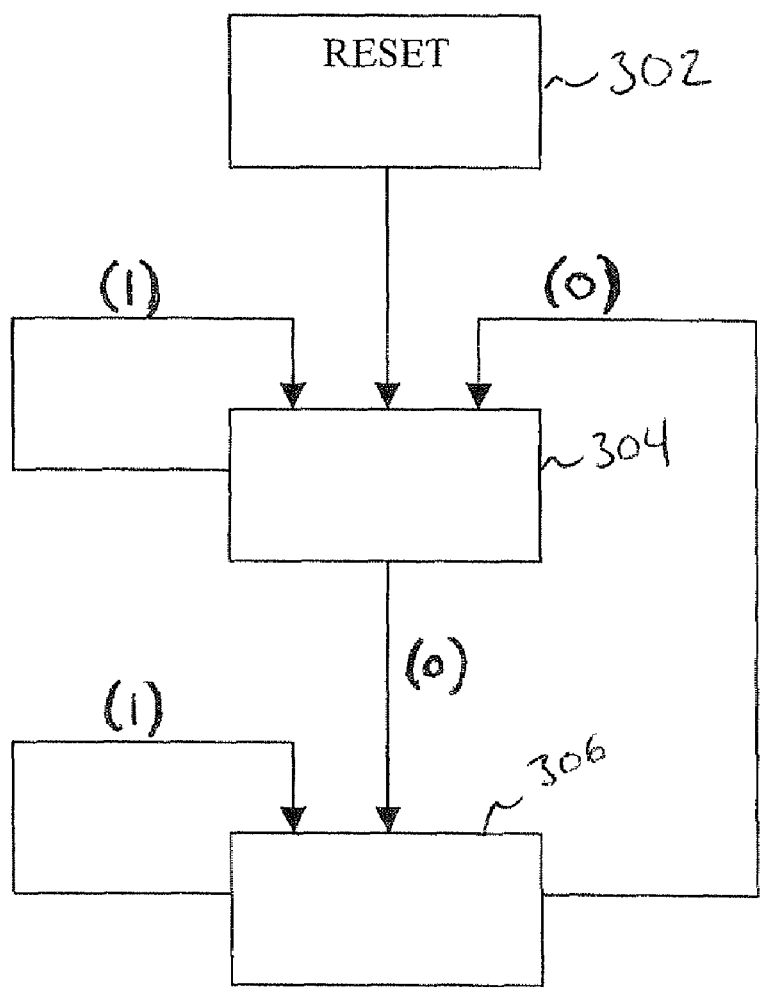
FIG. 3 is a state machine diagram depicting a scheme for switching between a primary fiber and a secondary (protection) fiber in an optical communication system, according to an embodiment of the present invention.

In operation, whether the transmission optical switch 106 operates in the first mode or the second mode depends on control signals that are generated by the controller 108 and are transmitted to the transmission optical switch 106. For example, FIG. 3 depicts a machine diagram of a scheme/method 300 for switching between the primary optical fiber 110 and the secondary optical fiber 112, according to an embodiment of the present invention. In this embodiment, in step 302, the controller 108 transmits a control signal to the transmission optical switch 106 that prompts the transmission optical switch 106 to operate in the first mode. In step 304, the controller 108 determines whether a predetermined condition is satisfied with respect to the primary optical fiber 110. For example, the predetermined condition may be associated with whether the optical reception switch 114 detects a signal on the primary optical fiber 110, an eye Q factor, a bit error rate, or any other information that indicates whether or not the primary optical fiber 110 is operating in a satisfactory manner. If the predetermined condition is satisfied with respect to the primary optical fiber 110 in step 304 (which corresponds to a logical "1"), the method 300 repeats step 304. Thus, so long as the predetermined condition is satisfied in step 304 with respect to the primary optical fiber 110, the transmission optical switch 106 will continue to operate in the first mode. However, if the predetermined condition is not satisfied with respect to the primary optical fiber 110 in step 304 (which corresponds to a logical "0"), then the controller 108 transmits a control signal to the transmission optical switch 106 that prompts the transmission optical switch 106 to transition from the first mode to the second mode.

In step 306, the controller 108 determines whether the predetermined condition is satisfied with respect to the secondary optical fiber 112. If the predetermined condition is satisfied with respect to the secondary optical fiber 112 in step 306, the method 300 repeats step 306. Thus, so long as the predetermined condition is satisfied in step 306 with respect to the secondary optical fiber 112, the transmission optical switch 106 will continue to operate in the second mode. However, if the predetermined condition is not satisfied with respect to the secondary optical fiber 112 in step 306, then the controller 108 transmits a control signal to the transmission optical switch 106 that prompts the transmission optical switch 106 to transition from the second mode to the first mode, and the method 300 returns to step 304.

Figure 4:
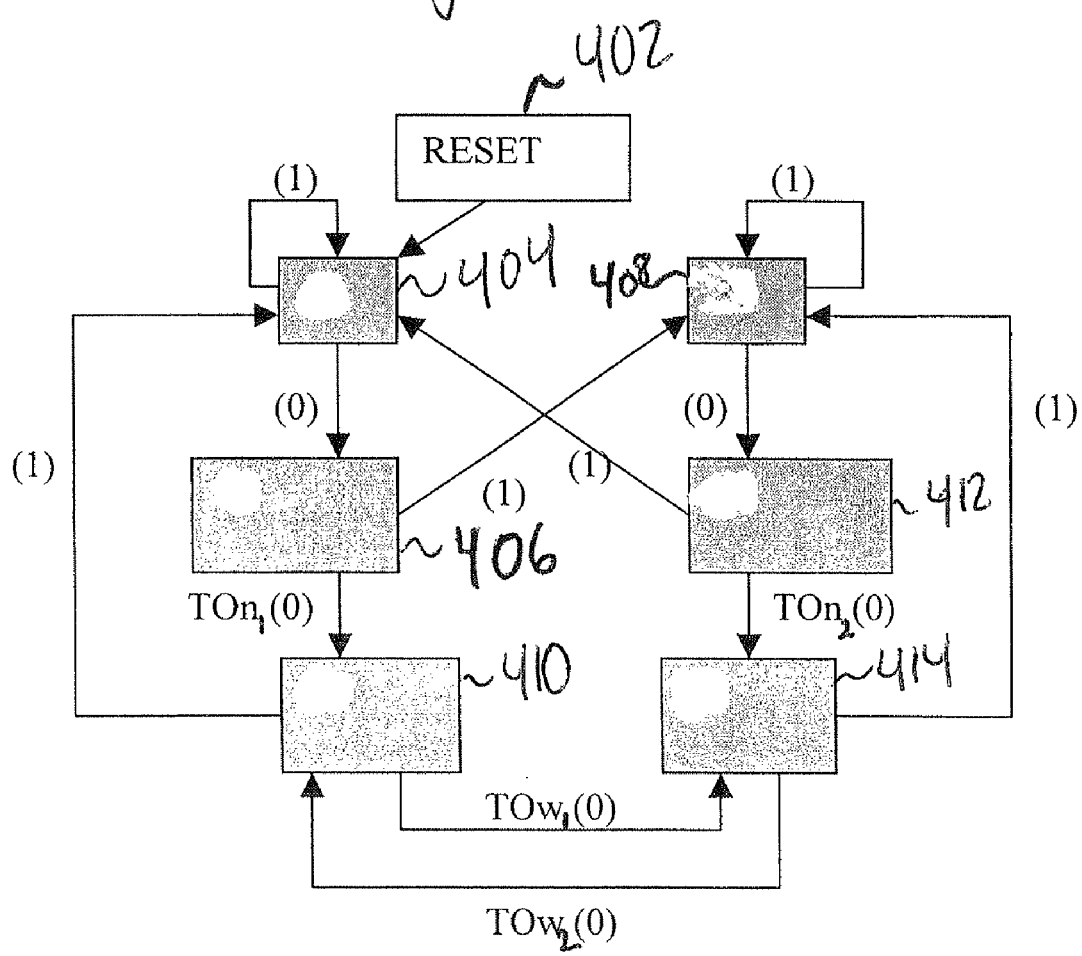
FIG. 4 is a state machine diagram depicting a scheme for switching between a primary fiber and a secondary (protection) fiber in an optical communication system, according to another embodiment of the present invention.

FIG. 4 depicts a machine diagram of a scheme/method 400 for switching between the primary optical fiber 110 and the secondary optical fiber 112, according to another embodiment of the present invention. In this embodiment, in step 402, the controller 108 transmits a control signal to the transmission optical switch 106 that prompts the transmission optical switch 106 to operate in the first mode. In step 404, the controller 108 determines whether a predetermined condition is satisfied with respect to the primary optical fiber 110. For example, the predetermined condition may be associated with whether the optical reception switch 114 detects a signal on the primary optical fiber 110, an eye Q factor, a bit error rate, or any other information that indicates whether or not the primary optical fiber 110 is operating in a satisfactory manner. If the predetermined condition is satisfied with respect to the primary optical fiber 110 in step 404 (which corresponds to a logical "1"), the method 400 repeats step 404. Thus, so long as the predetermined condition is satisfied in step 404 with respect to the primary optical fiber 110, the transmission optical switch 106 will continue to operate in the first mode. However, if the predetermined condition is not satisfied with respect to the primary optical fiber 110 in step 404 (which corresponds to a logical "0"), then the controller 108 transmits a control signal to the transmission optical switch 106 that prompts the transmission optical switch 106 to transition from the first mode to the second mode.

In step 406, the controller 108 continuously monitors whether the predetermined condition is satisfied with respect to the secondary optical fiber 112 during a first predetermined period of time $TOn_1$, e.g., about 100 milliseconds. When the predetermined condition is satisfied with respect to the secondary optical fiber 112 at some point during the first predetermined period of time $TOn_1$ in step 406, the method 400 proceeds to step 408. If, however, the predetermined condition is not satisfied with respect to the secondary optical fiber 112 before the expiration of the first predetermined period of time $TOn_1$ in step 406, then the controller 108 transmits a control signal to the transmission optical switch 106 that prompts the transmission optical switch 106 to transition from the second mode to the first mode, and the method 400 proceeds to step 410.

In step 410, the controller 108 continuously monitors whether the predetermined condition is satisfied with respect to the primary optical fiber 110 during a second predetermined period of time $TOw_1$, e.g., between about 100 milliseconds and 2 hours, and preferably between about 2 seconds and about 2 hours. When the predetermined condition is satisfied with respect to the primary optical fiber 110 at some point during the second predetermined period of time $TOw_1$ in step 410, the method 400 returns to step 404. If, however, the predetermined condition is not satisfied with respect to the primary optical fiber 110 before an expiration of the second predetermined period of time $TOw_1$ in step 410, the controller 108 transmits a control signal to the transmission optical switch 106 that prompts the transmission optical switch 106 to transition from the first mode to the second mode, and the method 400 proceeds to step 414.

As described above, when the predetermined condition is satisfied with respect to the secondary optical fiber 112 at some point during the first predetermined period of time $TOn_1$ in step 406, the method 400 proceeds to step 408. In step 408, the controller 108 determines whether the predetermined condition is satisfied with respect to the secondary optical fiber 112. If the predetermined condition is satisfied with respect to the secondary optical fiber 112 in step 408, the method 400 repeats step 408. Thus, so long as the predetermined condition is satisfied in step 408 with respect to the secondary optical fiber 112, the transmission optical switch 106 will continue to operate in the second mode. However, if the predetermined condition is not satisfied with respect to the secondary optical fiber 112 in step 408, then the controller 108 transmits a control signal to the transmission optical switch 106 that prompts the transmission optical switch 106 to transition from the second mode to the first mode, and the method 400 proceeds to step 412.

In step 412, the controller 408 continuously monitors whether the predetermined condition is satisfied with respect to the primary optical fiber 110 during a third predetermined period of time $TOn_2$, e.g., about 100 milliseconds. When the predetermined condition is satisfied with respect to the primary optical fiber 110 at some point during the third predetermined period of time $TOn_2$ in step 412, the method 400 returns to step 404. If, however, the predetermined condition is not satisfied with respect to the primary optical fiber 110 before an expiration of the third predetermined period of time $TOn_2$ in step 412, the controller 108 transmits a control signal to the transmission optical switch 106 that prompts the transmission optical switch 106 to transition from the first mode to the second mode, and the method 400 proceeds to step 414.

In step 414, the controller 108 continuously monitors whether the predetermined condition is satisfied with respect to the secondary optical fiber 112 at some point during a fourth predetermined period of time $TOw_2$, e.g., between about 100 milliseconds and 2 hours, and preferably between about 2 seconds and about 2 hours. When the predetermined condition is satisfied with respect to the secondary optical fiber 112 at some point during the fourth predetermined period of time $TOw_2$ in step 414, the method 400 returns to step 408. If, however, the predetermined condition is not satisfied with respect to the secondary optical fiber 112 before an expiration of the fourth predetermined period of time $TOw_2$ in step 414, the controller 108 transmits a control signal to the transmission optical switch 106 that prompts the transmission optical switch 106 to transition from the second mode to the first mode, and the method 400 returns to step 410.

Figure 5:
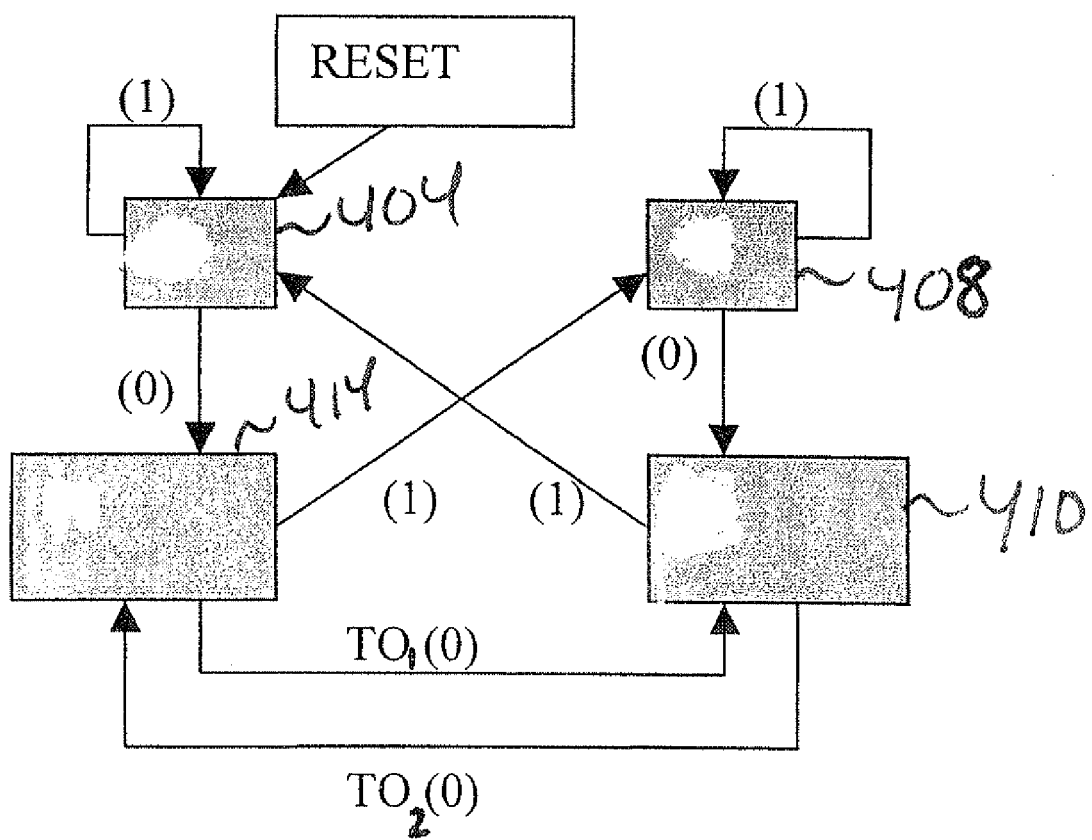
FIG. 5 is a state machine diagram depicting a scheme for switching between a primary fiber and a secondary (protection) fiber in an optical communication system, according to yet another embodiment of the present invention.

FIG. 5 depicts a machine diagram of a scheme/method 500 for switching between the primary optical fiber 110 and the secondary optical fiber 112, according to yet another embodiment of the present invention. This embodiment of the present invention is similar to the embodiment of the present invention depicted in FIG. 4, except that the first predetermined period of time $TOn_1$, the second predetermined period of time $TOw_1$, the third predetermined period of time $TOn_2$, and the fourth predetermined period of time $TOw_2$ are equal to each other, e.g., are equal to about 100 milliseconds. For example, this embodiment of the present invention may be employed when continuous switching of the transmission optical switch 106 between the first mode and the second mode when the predetermined condition is not satisfied with respect to primary optical fiber 110 and the secondary optical fiber 112 is desired, e.g., when the durability of the transmission optical switch 106 is not a substantial issue.

Figure 6:
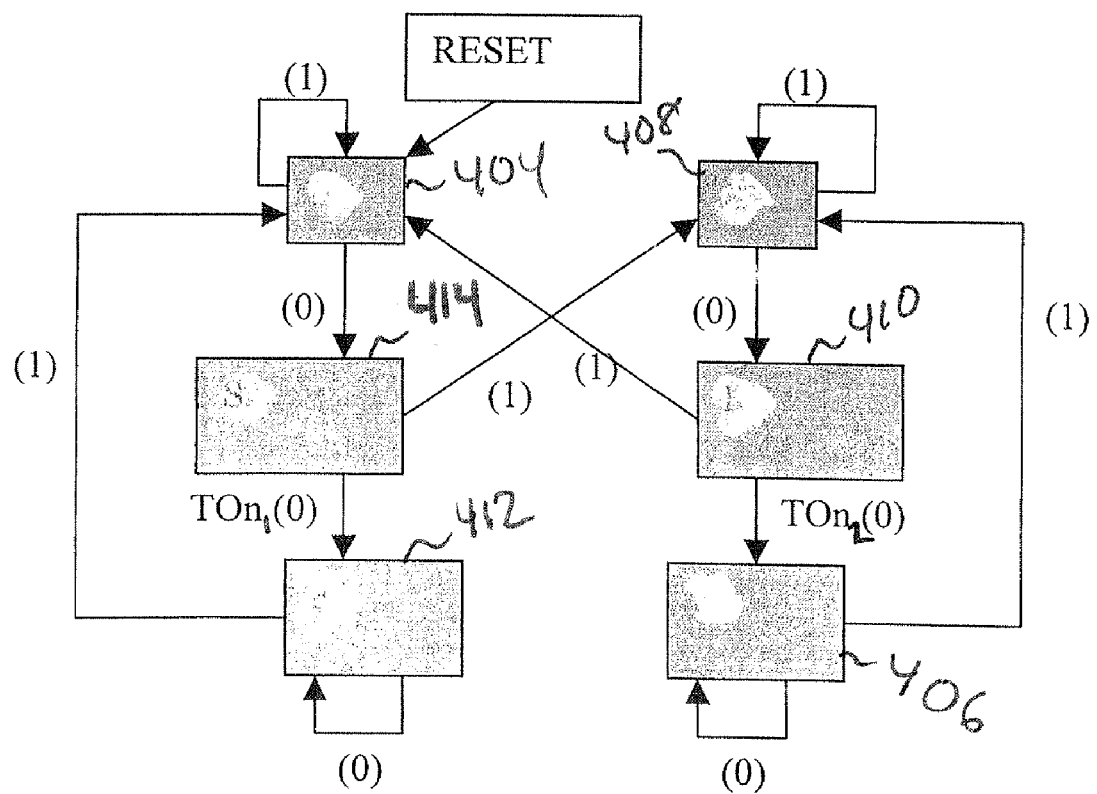
FIG. 6 is a state machine diagram depicting a scheme for switching between a primary fiber and a secondary (protection) fiber in an optical communication system, according to still yet another embodiment of the present invention.

FIG. 6 depicts a machine diagram of a scheme/method 600 for switching between the primary optical fiber 110 and the secondary optical fiber 112, according to still yet another embodiment of the present invention. This embodiment of the present invention is similar to the embodiment of the present invention depicted in FIG. 4, except that the second predetermined period of time $TOw_1$ and the fourth predetermined period of time $TOw_2$ are each an infinite amount of time. For example, this embodiment of the present invention may be employed when switching of the transmission optical switch 106 between the first mode and the second mode when the predetermined condition is not satisfied with respect to primary optical fiber 110 and the secondary optical fiber 112 is not desired, e.g., when the durability of the transmission optical switch 106 is a substantial issue.

FIG. 7 depicts a machine diagram of a scheme/method 700 for switching between the primary optical fiber 110 and the secondary optical fiber 112, according to a further embodiment of the present invention. This embodiment of the present invention employs a primary predetermined condition and a secondary predetermined condition. Specifically, in step 702, the controller 108 transmits a control signal to the transmission optical switch 106 that prompts the transmission optical switch 106 to operate in the first mode. In step 704, the controller 108 determines whether a primary predetermined condition is satisfied with respect to the primary optical fiber 110. For example, the primary predetermined condition may be associated with whether the optical reception switch 114 detects a signal on the primary optical fiber 110, an eye Q factor, a bit error rate, or any other information that indicates whether or not the primary optical fiber 110 is operating in a satisfactory manner. If the primary predetermined condition is satisfied with respect to the primary optical fiber 110 in step 704 (which corresponds to a logical "X,1"), the method 700 repeats step 704. Thus, so long as the primary predetermined condition is satisfied in step 704 with respect to the primary optical fiber 110, the transmission optical switch 106 will continue to operate in the first mode. However, if the primary predetermined condition is not satisfied with respect to the primary optical fiber 110 in step 704 (which corresponds to a logical "X,0"), then the controller 108 transmits a control signal to the transmission optical switch 106 that prompts the transmission optical switch 106 to transition from the first mode to the second mode.

In step 706, the controller 108 determines whether the primary predetermined condition is satisfied with respect to the secondary optical fiber 112. If the primary predetermined condition is satisfied with respect to the secondary optical fiber 112 in step 706, the method 700 proceeds to step 708. If, however, the primary predetermined condition is not satisfied with respect to the secondary optical fiber 112 in step 706, then the controller 108 transmits a control signal to the transmission optical switch 106 that prompts the transmission optical switch 106 to transition from the second mode to the first mode, and the method 700 proceeds to step 710.

In step 710, the controller 108 determines whether the primary predetermined condition and a secondary predetermined condition that is different than the primary predetermined condition are satisfied with respect to the primary optical fiber 110. For example, the secondary predetermined condition may be associated with whether the optical reception switch 114 detects a signal on the primary optical fiber 110, an eye Q factor, a bit error rate, or any other information that indicates whether or not the primary optical fiber 110 is operating in a satisfactory manner. If the primary predetermined condition is satisfied with respect to the primary optical fiber 110 in step 710, the method 700 returns to step 704. If, however, the primary predetermined condition is not satisfied with respect to the primary optical fiber 110 in step 710, but the secondary predetermined condition is satisfied with respect to the primary optical fiber 110 in step 710 (which corresponds to a logical "1,0"), the method 700 repeats step 710. Moreover, if neither the primary predetermined condition nor the secondary predetermined condition are satisfied with respect to the primary optical fiber 110 in step 710 (which corresponds to a logical "0,0"), the controller 108 transmits a control signal to the transmission optical switch 106 that prompts the transmission optical switch 106 to transition from the first mode to the second mode, and the method 700 proceeds to step 712.

In step 712, the controller 108 determines whether the primary predetermined condition and the secondary predetermined condition are satisfied with respect to the secondary optical fiber 112. If neither the primary predetermined condition nor the secondary predetermined condition are satisfied with respect to the secondary optical fiber 112 in step 712, the controller 108 transmits a control signal to the transmission optical switch 106 that prompts the transmission optical switch 106 to transition from the second mode to the first mode, and the method 700 returns to step 710. If, however, the primary predetermined condition is satisfied with respect to the secondary optical fiber 112 in step 712, the method 700 proceeds to step 708. Moreover, if the primary predetermined condition is not satisfied with respect to the secondary optical fiber 112 in step 712, but the secondary predetermined condition is satisfied with respect to the secondary optical fiber 112 in step 712, the method 700 proceeds to step 716.

As described above, if the primary predetermined condition is satisfied with respect to the secondary optical fiber 112 in step 706, the method 700 proceeds to step 708, and if the primary predetermined condition is satisfied with respect to the secondary optical fiber 112 in step 712, the method 700 proceeds to step 708. In step 708, the controller 108 determines whether the primary predetermined condition is satisfied with respect to the secondary optical fiber 112. If the primary predetermined condition is satisfied with respect to the secondary optical fiber 112 in step 708, the method 700 repeats step 708. If, however, the primary predetermined condition is not satisfied with respect to the secondary optical fiber 112 in step 708, the controller 108 transmits a control signal to the transmission optical switch 106 that prompts the transmission optical switch 106 to transition from the second mode to the first mode, and the method 700 proceeds to step 714.

In step 714, the controller 108 determines whether the primary predetermined condition is satisfied with respect to the primary optical fiber 110. If the primary predetermined condition is satisfied with respect to the primary optical fiber 110 in step 714, the method 700 returns to step 704. If, however, the primary predetermined condition is not satisfied with respect to the primary optical fiber 110 in step 714, the controller 108 transmits a control signal to the transmission optical switch 106 that prompts the transmission optical switch 106 to transition from the first mode to the second mode, and the method 700 proceeds to step 716.

As described above, if the primary predetermined condition is not satisfied with respect to the secondary optical fiber 112 in step 712, but the secondary predetermined condition is satisfied with respect to the secondary optical fiber 112 in step 712, the method 700 proceeds to step 716. Moreover, if the primary predetermined condition is not satisfied with respect to the primary optical fiber 110 in step 714, the method 700 proceeds to step 716. In step 716, the controller 108 determines whether the primary predetermined condition and the secondary predetermined condition are satisfied with respect to the secondary optical fiber 112. If the primary predetermined condition is satisfied with respect to the secondary optical fiber 112 in step 716, the method 700 returns to 708. If, however, the primary predetermined condition is not satisfied with respect to the secondary optical fiber 112 in step 716, but the secondary predetermined condition is satisfied with respect to the secondary optical fiber 112 in step 716, the method 700 repeats step 716. Moreover, if neither the primary predetermined condition nor the secondary predetermined condition are satisfied with respect to the secondary optical fiber 112 in step 716, the controller 108 transmits a control signal to the transmission optical switch 106 that prompts the transmission optical switch 106 to transition from the second mode to the first mode, and the method 700 proceeds to step 718.

In step 718, the controller 108 determines whether the primary predetermined condition and the secondary predetermined condition are satisfied with respect to the primary optical fiber 110. If neither the primary predetermined condition nor the secondary predetermined condition are satisfied with respect to the primary optical fiber 110 in step 718, the controller 108 transmits a control signal to the transmission optical switch 106 that prompts the transmission optical switch 106 to transition from the first mode to the second mode, and the method 700 returns to step 716. If, however, the primary predetermined condition is satisfied with respect to the primary optical fiber 110 in step 718, the method 700 returns to step 704. Moreover, if the primary predetermined condition is not satisfied with respect to the primary optical fiber 110 in step 718, but the secondary predetermined condition is satisfied with respect to the primary optical fiber 110 in step 718, the method 700 returns to step 710.

FIG. 8 depicts a machine diagram of a scheme/method 800 for switching between the primary optical fiber 110 and the secondary optical fiber 112, according to yet a further embodiment of the present invention. This embodiment of the present invention also employs a primary predetermined condition and a secondary predetermined condition. Specifically, in step 802, the controller 108 transmits a control signal to the transmission optical switch 106 that prompts the transmission optical switch 106 to operate in the first mode. In step 804, the controller 108 determines whether a primary predetermined condition is satisfied with respect to the primary optical fiber 110. For example, the primary predetermined condition may be associated with whether the optical reception switch 114 detects a signal on the primary optical fiber 110, an eye Q factor, a bit error rate, or any other information that indicates whether or not the primary optical fiber 110 is operating in a satisfactory manner. If the primary predetermined condition is satisfied with respect to the primary optical fiber 110 in step 804 (which corresponds to a logical "X,1"), the method 800 repeats step 804. Thus, so long as the primary predetermined condition is satisfied in step 804 with respect to the primary optical fiber 110, the transmission optical switch 106 will continue to operate in the first mode. However, if the primary predetermined condition is not satisfied with respect to the primary optical fiber 110 in step 804 (which corresponds to a logical "X,0"), then the controller 108 transmits a control signal to the transmission optical switch 106 that prompts the transmission optical switch 106 to transition from the first mode to the second mode.

In step 806, the controller 108 continuously monitors whether the primary predetermined condition is satisfied with respect to the secondary optical fiber 112 during a first predetermined period of time $TOn_1$, e.g., about 100 milliseconds. When the primary predetermined condition is satisfied with respect to the secondary optical fiber 112 at any time during the first predetermined period of time $TOn_1$ in step 806, the method 800 proceeds to step 808. If, however, the primary predetermined condition is not satisfied with respect to the secondary optical fiber 112 before the expiration of the first predetermined period of time $TOn_1$ in step 806, then the controller 108 transmits a control signal to the transmission optical switch 106 that prompts the transmission optical switch 106 to transition from the second mode to the first mode, and the method 800 proceeds to step 810.

In step 810, the controller 108 continuously monitors whether the primary predetermined condition and a secondary predetermined condition that is different than the primary predetermined condition are satisfied with respect to the primary optical fiber 110 during a second predetermined period of time $TOw_1$, e.g., between about 100 milliseconds and 2 hours, and preferably between about 2 seconds and about 2 hours. For example, the secondary predetermined condition may be associated with whether the optical reception switch 114 detects a signal on the primary optical fiber 110, an eye Q factor, a bit error rate, or any other information that indicates whether or not the primary optical fiber 110 is operating in a satisfactory manner. When the primary predetermined condition is satisfied with respect to the primary optical fiber 110 at some point during the second predetermined period of time $TOw_1$ in step 810, the method 800 returns to step 804. If, however, the primary predetermined condition is not satisfied with respect to the primary optical fiber 110 before the expiration of the second predetermined period of time $TOw_1$ in step 810, but the secondary predetermined condition is satisfied with respect to the primary optical fiber 110 at some point during the second predetermined period of time $TOw_1$ in step 810 (which corresponds to a logical "1,0"), the method 800 proceeds to step 812. Moreover, if neither the primary predetermined condition nor the secondary predetermined condition are satisfied with respect to the primary optical fiber 110 before the expiration of the second predetermined period of time $TOw_1$ in step 810 (which corresponds to a logical "0,0"), the controller 108 transmits a control signal to the transmission optical switch 106 that prompts the transmission optical switch 106 to transition from the first mode to the second mode, and the method 800 proceeds to step 818.

In step 812, the controller 108 determines whether the primary predetermined condition and the secondary predetermined condition are satisfied with respect to the primary optical fiber 110. If the primary predetermined condition is satisfied with respect to the primary optical fiber 110 in step 812, the method 800 returns to step 804. If, however, the primary predetermined condition is not satisfied with respect to the primary optical fiber 110 in step 812, but the secondary predetermined condition is satisfied with respect to the primary optical fiber 110 in step 812, the method 800 repeats step 812. Moreover, if neither the primary predetermined condition nor the secondary predetermined condition are satisfied with respect to the primary optical fiber 110 in step 812, the controller 108 transmits a control signal to the transmission optical switch 106 that prompts the transmission optical switch 106 to transition from the first mode to the second mode, and the method 800 proceeds to step 814.

In step 814, the controller 108 continuously monitors whether the primary predetermined condition and the secondary predetermined condition are satisfied with respect to the secondary optical fiber 112 during a third predetermined period of time $TOn_2$, e.g., about 100 milliseconds. If neither the primary predetermined condition nor the secondary predetermined condition are satisfied with respect to the secondary optical fiber 112 before the expiration of the third predetermined period of time $TOn_2$ in step 814, the controller 108 transmits a control signal to the transmission optical switch 106 that prompts the transmission optical switch 106 to transition from the second mode to the first mode, and the method 800 returns to step 810. However, when the primary predetermined condition is satisfied with respect to the secondary optical fiber 112 at some point during the third predetermined period of time $TOn_2$ in step 814, the method 800 proceeds to step 808. Moreover, if the primary predetermined condition is not satisfied with respect to the secondary optical fiber 112 before the expiration of the third predetermined period of time $TOn_2$ in step 814, but the secondary predetermined condition is satisfied with respect to the secondary optical fiber 112 at some point during the third predetermined period of time $TOn_2$ in step 814, the method 800 proceeds to step 820.

As described above, if the primary predetermined condition is satisfied with respect to the secondary optical fiber 112 in step 806, the method 800 proceeds to step 808, and when the primary predetermined condition is satisfied with respect to the secondary optical fiber 112 at some point during the third predetermined period of time $TOn_2$ in step 814, the method 800 proceeds to step 808. In step 808, the controller 108 determines whether the primary predetermined condition is satisfied with respect to the secondary optical fiber 112. If the primary predetermined condition is satisfied with respect to the secondary optical fiber 112 in step 808, the method 800 repeats step 808. If, however, the primary predetermined condition is not satisfied with respect to the secondary optical fiber 112 in step 808, the controller 108 transmits a control signal to the transmission optical switch 106 that prompts the transmission optical switch 106 to transition from the second mode to the first mode, and the method 800 proceeds to step 816.

In step 816, the controller 108 continuously monitors whether the primary predetermined condition is satisfied with respect to the primary optical fiber 110 during a fourth predetermined period of time $TOn_3$, e.g., about 100 milliseconds. When the primary predetermined condition is satisfied with respect to the primary optical fiber 110 at any time during the fourth predetermined period of time $TOn_3$ in step 816, the method 800 returns to step 804. If, however, the primary predetermined condition is not satisfied with respect to the primary optical fiber 110 before the expiration of the fourth predetermined period of time $TOn_3$ in step 816, then the controller 108 transmits a control signal to the transmission optical switch 106 that prompts the transmission optical switch 106 to transition from the second mode to the first mode, and the method 800 proceeds to step 818.

As described above, if neither the primary predetermined condition nor the secondary predetermined condition are satisfied with respect to the primary optical fiber 110 before the expiration of the second predetermined period of time $TOw_1$ in step 810, the method 800 proceeds to step 818, and if the primary predetermined condition is not satisfied with respect to the primary optical fiber 110 before the expiration of the fourth predetermined period of time $TOn_3$ in step 816, the method 800 proceeds to step 818. In step 818, the controller 108 continuously monitors whether the primary predetermined condition and the secondary predetermined condition are satisfied with respect to the secondary optical fiber 112 during a fifth predetermined period of time $TOw_2$, e.g., between about 100 milliseconds and 2 hours, and preferably between about 2 seconds and about 2 hours. When the primary predetermined condition is satisfied with respect to the secondary optical fiber 112 at some point during the fifth predetermined period of time $TOw_2$ in step 818, the method 800 returns to step 808. If, however, the primary predetermined condition is not satisfied with respect to the secondary optical fiber 112 before the expiration of the fifth predetermined period of time $TOw_2$ in step 818, but the secondary predetermined condition is satisfied with respect to the secondary optical fiber 112 at some point during the fifth predetermined period of time $TOw_2$ in step 818, the method 800 proceeds to step 820. Moreover, if neither the primary predetermined condition nor the secondary predetermined condition are satisfied with respect to the secondary optical fiber 112 before the expiration of the fifth predetermined period of time $TOw_2$ in step 818, the controller 108 transmits a control signal to the transmission optical switch 106 that prompts the transmission optical switch 106 to transition from the second mode to the first mode, and the method 800 returns to step 810.

As described above, if the primary predetermined condition is not satisfied with respect to the secondary optical fiber 112 before the expiration of the third predetermined period of time $TOn_2$ in step 814, but the secondary predetermined condition is satisfied with respect to the secondary optical fiber 112 at some point during the third predetermined period of time $TOn_2$ in step 814, the method 800 proceeds to step 820. Similarly, if the primary predetermined condition is not satisfied with respect to the secondary optical fiber 112 before the expiration of the fifth predetermined period of time $TOw_2$ in step 818, but the secondary predetermined condition is satisfied with respect to the secondary optical fiber 112 at some point during the fifth predetermined period of time $TOw_2$ in step 818, the method 800 proceeds to step 820. In step 820, the controller 108 determines whether the primary predetermined condition and the secondary predetermined condition are satisfied with respect to the secondary optical fiber 112. If the primary predetermined condition is satisfied with respect to the secondary optical fiber 112 in step 820, the method 800 returns to step 808. If, however, the primary predetermined condition is not satisfied with respect to the secondary optical fiber 112 in step 820, but the secondary predetermined condition is satisfied with respect to the secondary optical fiber 112 in step 820, the method 800 repeats step 820. Moreover, if neither the primary predetermined condition nor the secondary predetermined condition are satisfied with respect to the secondary optical fiber 112 in step 820, the controller 108 transmits a control signal to the transmission optical switch 106 that prompts the transmission optical switch 106 to transition from the second mode to the first mode, and the method 800 proceeds to step 822.

In step 822, the controller 108 continuously monitors whether the primary predetermined condition and the secondary predetermined condition are satisfied with respect to the primary optical fiber 110 during a sixth predetermined period of time $TOn_4$, e.g., about 100 milliseconds. If neither the primary predetermined condition nor the secondary predetermined condition are satisfied with respect to the primary optical fiber 110 before the expiration of the sixth predetermined period of time $TOn_4$ in step 822, the controller 108 transmits a control signal to the transmission optical switch 106 that prompts the transmission optical switch 106 to transition from the first mode to the second mode, and the method 800 returns to step 818. However, when the primary predetermined condition is satisfied with respect to the primary optical fiber 110 at some point during the sixth predetermined period of time $TOn_4$ in step 822, the method 800 returns to step 804. Moreover, if the primary predetermined condition is not satisfied with respect to the primary optical fiber 110 before the expiration of the sixth predetermined period of time $TOn_4$ in step 822, but the secondary predetermined condition is satisfied with respect to the primary optical fiber 110 at some point during the sixth predetermined period of time $TOn_4$ in step 822, the method 800 returns to step 812.

While the above-described embodiments of the present invention involve methods for switching between the primary optical fiber 110 and the secondary optical fiber 112 based on one or two predetermined conditions, those of ordinary skill in the art readily will understand that the above-described embodiments of the present invention may be modified to employ any number of predetermined conditions.

While the present invention has been described in connection with preferred embodiments, it will be understood by those skilled in the art that variations and modifications of the preferred embodiments described above may be made without departing from the scope of the invention. Other embodiments will be apparent to those skilled in the art from a consideration of the specification or from a practice of the invention disclosed herein. It is intended that the specification and the described examples are considered exemplary only, with the true scope of the invention indicated by the following claims.

The invention claimed is:

1. An optical communication system, comprising:
   a first optical device comprising a transmission optical switch and a controller coupled to the transmission optical switch; and
   a second optical device coupled to the first optical device via each of a first fiber and a second fiber, wherein the transmission optical switch is configured to connect the first and second optical devices via the first fiber and is configured to connect the first and second optical devices via the second fiber based on control signals generated by the controller, wherein the controller is configured:

(a) to transmit a first control signal to the transmission optical switch that prompts the transmission optical switch to connect the first and second optical devices via the first fiber;
(b) to determine whether a predetermined condition is satisfied with respect to the first fiber;
(c) if the predetermined condition is satisfied with respect to the first fiber in step (b), to return to step (b); and
(d) if the predetermined condition is not satisfied with respect to the first fiber in step (b), to transmit a second control signal to the transmission optical switch that causes the optical switch to connect the first and second optical devices via the second fiber.

2. A method of operating an optical communication system, wherein the optical communication system comprises a first optical device comprising a transmission optical switch and a controller coupled to the transmission optical switch; and a second optical device coupled to the first optical device via each of a first fiber and a second fiber, wherein the transmission optical switch is configured to connect the first and second optical devices via the first fiber and is configured to connect the first and second optical devices via the second fiber based on control signals generated by the controller, wherein the method comprises:

(a) transmitting a first control signal to the transmission optical switch that prompts the transmission optical switch to connect the first and second optical devices via the first fiber;
(b) determining whether a predetermined condition is satisfied with respect to the first fiber;
(c) if the predetermined condition is satisfied with respect to the first fiber in step (b), returning to step (b); and
(d) if the predetermined condition is not satisfied with respect to the first fiber in step (b), transmitting a second control signal to the transmission optical switch that causes the optical switch to connect the first and second optical devices via the second fiber.

* * * * *